(12) United States Patent
Iwasaki et al.

(10) Patent No.: US 9,430,172 B2
(45) Date of Patent: Aug. 30, 2016

(54) PRINT SYSTEM, IMAGE FORMING APPARATUS, INFORMATION PROCESSING APPARATUS, PRINT SERVICE SYSTEM, AND STORAGE MEDIUM FOR AUTHORIZING ACCESS TO PRINT DATA HELD BY A PRINT SERVICE SYSTEM

(71) Applicant: FUJI XEROX CO., LTD., Tokyo (JP)

(72) Inventors: Manabu Iwasaki, Yokohama (JP); Shin Ohtake, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/940,973

(22) Filed: Nov. 13, 2015

(65) Prior Publication Data

US 2016/0070512 A1 Mar. 10, 2016

Related U.S. Application Data

(63) Continuation of application No. 14/724,059, filed on May 28, 2015, now Pat. No. 9,219,726, which is a continuation of application No. 14/289,850, filed on May 29, 2014, now Pat. No. 9,063,680.

(30) Foreign Application Priority Data

Dec. 18, 2013 (JP) ................................. 2013-261447

(51) Int. Cl.
| | |
|---|---|
| G06K 15/00 | (2006.01) |
| G06F 3/12 | (2006.01) |
| H04L 29/06 | (2006.01) |
| H04N 1/00 | (2006.01) |

(52) U.S. Cl.
CPC ............ *G06F 3/1222* (2013.01); *G06F 3/1238* (2013.01); *G06F 3/1287* (2013.01); *H04L 63/08* (2013.01); *H04N 1/001* (2013.01); *H04N 1/00095* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,426,053 B2 | 9/2008 | Henderson et al. | |
| 8,189,225 B1 * | 5/2012 | Lo ........................... | G06F 3/122 |
| | | | 358/1.15 |

(Continued)

FOREIGN PATENT DOCUMENTS

| | | |
|---|---|---|
| JP | 11-123859 A | 5/1999 |
| JP | 2013-522774 A | 6/2013 |
| WO | 2011/115987 A2 | 9/2011 |

*Primary Examiner* — Dov Popovici
(74) *Attorney, Agent, or Firm* — Sughrue Mion, PLLC

(57) ABSTRACT

A print system includes a print service system, an information processing apparatus, and an image forming apparatus. The print service system includes a holding unit associated with a user and holding print data instructed by the user, a providing unit that provides access authorization information for the holding unit, to the information processing apparatus upon a request thereof, and an access authorizing unit that authorizes an access to the holding unit if receives the access authorization information. The information processing apparatus includes a transmitting unit that transmits the access authorization information to the image forming apparatus by proximity communication. The image forming apparatus includes an authorization information acquiring unit that acquires the access authorization information by the proximity communication, and a print data acquiring unit that sends the acquired access authorization information to the print service system, is authorized to access the holding unit, and acquires the print data.

6 Claims, 6 Drawing Sheets

(56) References Cited

U.S. PATENT DOCUMENTS

| | | |
|---|---|---|
| 8,279,471 B2 | 10/2012 | Ferlitsch |
| 2002/0041394 A1 | 4/2002 | Aoki |
| 2003/0084331 A1 | 5/2003 | Dixon et al. |
| 2004/0019643 A1 | 1/2004 | Zirnstein, Jr. |
| 2004/0083393 A1 | 4/2004 | Jordan et al. |
| 2006/0164676 A1 | 7/2006 | Walker et al. |
| 2009/0046315 A1 | 2/2009 | Ferlitsch et al. |
| 2013/0070278 A1 | 3/2013 | Cochran et al. |

\* cited by examiner

PRINT SYSTEM, IMAGE FORMING APPARATUS, INFORMATION PROCESSING APPARATUS, PRINT SERVICE SYSTEM, AND STORAGE MEDIUM FOR AUTHORIZING ACCESS TO PRINT DATA HELD BY A PRINT SERVICE SYSTEM

CROSS-REFERENCE TO RELATED APPLICATIONS

This application is a Continuation of U.S. application Ser. No. 14/724,059 filed May 28, 2015, which is a Continuation of U.S. application Ser. No. 14/289,850, filed May 29, 2014, which issued as U.S. Pat. No. 9,063,680 on Jun. 23, 2015, which is based on and claims priority under 35 USC 119 from Japanese Patent Application No. 2013-261447 filed Dec. 18, 2013, the disclosures of which are incorporated herein in their entirety.

BACKGROUND (i) Technical Field

The present invention relates to a print system, an image forming apparatus, an information processing apparatus, a print service system, and a storage medium.

(ii) Related Art

In recent years, there is suggested a cloud print service provided on the Internet, such as Google Cloud Print (trademark) which is a concept of Google (registered trademark). A user logs in to a cloud print service from a personal computer (PC) or the like, by using a user ID of the service, and after the login, the user sends print data to the cloud print service. The print data is provided from the cloud print service to an image forming apparatus through the Internet or the like, and hence printing is performed.

When a public cloud print service, such as Google Cloud Print, is used, a user previously registers capability information etc. of image forming apparatuses, which are used by the user, in the cloud print service. The user logs in to the print service, designates a document to be printed, and selects a print output target of this time from among the previously registered image forming apparatuses. In response to this, the print service converts the document to be printed into print data in a predetermined print data format such as portable Document Format (PDF), and provides the print data to the selected image forming apparatus to cause the apparatus to print the print data.

An image forming apparatus, which is frequently used by the user (for example, a printer at home), may be associated with the account of the user and may be registered in the cloud print service. With the registration, by logging in to the cloud print service with the account of the user and instructing printing, the user may execute a printout from the image forming apparatus.

In contrast, such registration may be complicated for an image forming apparatus, which is owned or administered by other person, for example, an image forming apparatus in a shop such as a convenience store on a street corner, or an image forming apparatus at a visiting place (other department of a company to which the user belongs, or a company of a business partner). In general, an image forming apparatus is permanently registered in a cloud print service, and it lasts unless a cancel operation is performed (for example, in case of Google Cloud Print). Hence, in the viewpoint of the owner or administrator of the image forming apparatus, a person other than the persons concerned is not generally allowed to make registration for an image forming apparatus.

In case of Google Cloud Print, by using a share function, the owner or administrator of the image forming apparatus may allow other person to use the image forming apparatus that is registered by the owner or administrator in Google Cloud Print. For example, when printing is desired to be performed through the cloud from an image forming apparatus at a visiting place, if the owner or administrator of the image forming apparatus at the visiting place previously makes setting for account sharing, an output may be made from the image forming apparatus through the cloud print service by using the account of the owner or administrator.

Also, in case of Google Cloud Print, when printing is instructed to the cloud, a logical printer corresponding to a physical image forming apparatus serving as an output target is required to be selected and a print instruction is required to be given to the selected logical printer.

SUMMARY

According to an aspect of the invention, there is provided a print system including a print service system, an information processing apparatus, and an image forming apparatus. The print service system includes a holding unit that is associated with a user and holds print data, which is instructed by the user for printing, a providing unit that provides access authorization information for the holding unit associated with the user, to the information processing apparatus in response to a request from the information processing apparatus operated by the user, and an access authorizing unit that authorizes an access to the holding unit corresponding to the access authorization information if the access authorizing unit receives the access authorization information from the image forming apparatus. The information processing apparatus includes a transmitting unit that transmits the access authorization information received from the print service system to the image forming apparatus by proximity communication. The image forming apparatus includes an authorization information acquiring unit that acquires the access authorization information from the information processing apparatus by the proximity communication, and a print data acquiring unit that sends the acquired access authorization information to the print service system, is authorized to access the holding unit corresponding to the access authorization information, and acquires the print data held in the holding unit for print processing.

BRIEF DESCRIPTION OF THE DRAWINGS

An exemplary embodiment of the present invention will be described in detail based on the following figures, wherein.

DETAILED DESCRIPTION

Figure 1:
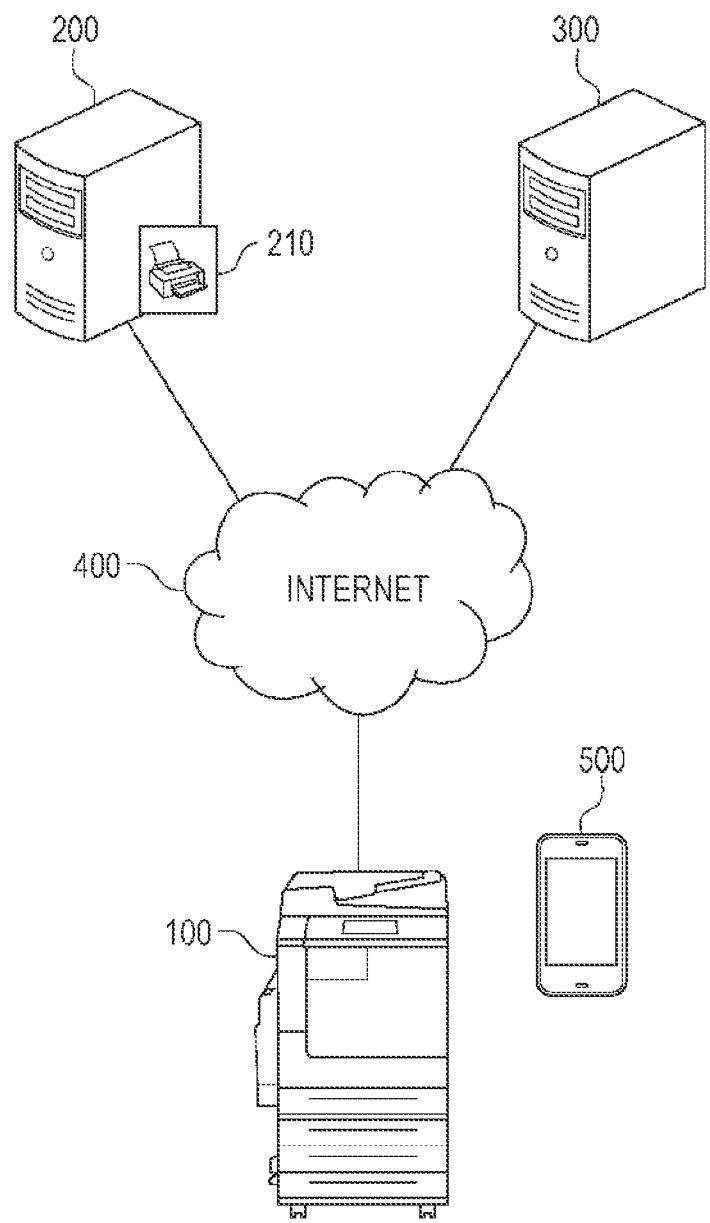
FIG. 1 illustrates an example system configuration according to an exemplary embodiment.

An example configuration of a system according to this exemplary embodiment is described with reference to FIG. 1. The exemplified system includes an image forming apparatus 100, a cloud print service 200, a cloud repository service 300, and a mobile terminal 500, which may mutually make communication with each other through the Internet 400. The mobile terminal 500 is carried by a user.

The image forming apparatus 100 is an apparatus that prints out input image data on a sheet. The image forming apparatus 100 may have a function other than the print function. For example, the image forming apparatus 100 may be a digital multi-function apparatus having a scan function, a copy function, a facsimile function, and an e-mail transmission function, in addition to the print function. The image forming apparatus 100 has functions of executing processing of copying, scanning, printing, etc., in response to an instruction from a user accepted by a user interface (UI) unit 108 (see FIG. 3) of the image forming apparatus 100. In addition, the image forming apparatus 100 has a function of acquiring print data from the cloud print service 200 on the Internet 400 and printing out the print data. Alternatively, the image forming apparatus 100 may be connected with a network in a group of a company etc. In this case, the image forming apparatus 100 has a function of executing processing such as printing in response to an instruction from a computer connected with the network in the group.

Also, the image forming apparatus 100 has a cloud print support function, that is, a function of executing print processing with use of the cloud print service 200. In the cloud print support function, for example, the image forming apparatus 100 may include a function of registering the image forming apparatus 100 in the cloud print service 200 and accepting a physical printer ID (described later), a function of making communication with the cloud print service 200 through any kind of protocol and receiving print data in which the image forming apparatus 100 is designated as an output target, etc. If the image forming apparatus 100 does not have the cloud print support function, a computer such as a personal computer (PC) connected with the image forming apparatus 100 is prepared, and the computer may have the cloud print support function. In this case, the computer makes communication with the cloud print service 200, as a proxy of the image forming apparatus 100, and gives print data acquired from the cloud print service 200 to the image forming apparatus 100 to cause the image forming apparatus 100 to print the print data.

The cloud print service 200 is a system that provides a print service for a user, on a network such as the Internet by cloud computing. The cloud print service 200 is a system typically including plural computers. Alternatively, the cloud print service 200 may be formed of a single computer. For example, Google Cloud Print is an example of the cloud print service 200.

For example, the cloud print service 200 provides the user with a function of converting document data (generated by, for example, word processor or spread-sheet software), which is designated by a user as a print subject, into print data in a print data format (for example, page description language format, such as PostScript, registered trademark, or PDF format) available for the image forming apparatus 100, and a function of generating a print job corresponding to a received print instruction and administering the execution state etc. of the print job (for example, queue administration). The cloud print service 200 generates a logical printer (also called printer object) 210 that provides respective functions for a print service, and administers the logical printer 210. At least one user, who uses a logical printer 210, is registered in the logical printer 210. For example, the user ID of a user, who instructs generation of a logical printer 210, is registered in the logical printer 210, as administrator attribute information of the logical printer 210. Also, the administrator may set a share user who may share the logical printer 210. The user ID of the set share user is held in the logical printer 210, as share user attribute information.

In general, plural logical printers 210 are held in the cloud print service 200, and each of the logical printers 210 is used by at least one user (administrator or share user) registered in the logical printer 210.

Also, at least one physical printer as an output target (called "physical printer," for example, illustrated image forming apparatus 100), which outputs a print job held in a queue of a logical printer, may be registered in the logical printer 210. In this case, the logical printer 210 holds administration information for the registered physical printer. For example, the administration information includes identification information of the physical printer (for example, a unique physical printer ID given by the cloud print service 200, and an IP address of the physical printer), and performance information indicative of a performance (function) of the physical printer. For example, the performance information includes information indicative of whether duplex printing is available or not, whether full-color printing is available or not, and the size of sheets held therein. If the physical printer includes a post-processing apparatus, the performance information includes performances of the post-processing apparatus (for example, stapling function, punching function, and folding function).

The cloud print service 200 gives unique identification information (called "logical printer ID") to each of the respective logical printers 210. The cloud print service 200 administers the logical printers 210 by using the logical printer IDs.

The user registers (generates) own account in the cloud print service 200. When the user generates the account, the user registers a unique user ID in the cloud print service 200. In case of Google Cloud Print, a Google account, which is an account generally used for various services provided by Google, is used as the account (user ID) of the user for Google Cloud Print.

The cloud print service 200 generates a logical printer 210 in response to an instruction from a user. The cloud print service 200 stores user IDs of respective users for each of the logical printers 210, the users being registered as being allowed to use the logical printer 210. Also, a user who is allowed to use the logical printer 210 may be registered (share setting) for an existing logical printer 210, in response to an instruction who has the right of user registration.

The user logs in to the cloud print service 200 with own user ID by using a communication protocol, such as hypertext transfer protocol (HTTP) from a PC, a mobile terminal, an image forming apparatus 100, etc., which is connected through the Internet 400. The user gives a print instruction to the logical printer 210 selected from the logical printer 210 (plural logical printers may possibly exist) associated with the user ID. The print instruction includes information for designating a print subject, such as information of document data of the print subject or information for specifying the document data (for example, information of a storage location of the document data on the Internet 400 (for example, uniform resource locator, URL)). For example, the document data may occasionally exist in the cloud repository service 300 (described later). The logical printer 210 generates a print job in response to the print instruction, and administers the print job. The print job is a unit for administration of the print instruction in the logical printer 210. A unique job ID is given to the print job. The logical printer 210 administers information, such as information of the document data of the print subject, print data, for example, in a page description language format obtained by converting the document data, the user ID of the user who made the print instruction, and the execution state of the print job (for example, before execution, during execution, execution completed, error, and so forth), in association of the job ID.

The logical printer 210 provides the print data held therein to a physical printer of an output target instructed by the user. The print data may be provided in a manner in which the print data is directly transmitted from the logical printer 210 to the physical printer by a push method, or in a manner in which a message including information for specifying the print data is transmitted to the physical printer, the physical printer, which has received the message, requests for acquisition by HTTP, and the print job is provided in response to the acquisition request (pull method). For example, if the print job of the logical printer 210 is printed by the image forming apparatus 100 in an intranet isolated from the Internet 400 by a firewall, printing by the pull method is performed.

When the physical printer is desired to be used for printing in the cloud print service 200, the user typically performs a registration operation for the physical printer in the cloud print service 200. With this registration operation, the cloud print service 200 is able to identify and authenticate the physical printer. For example, the identification information of the physical printer becomes common knowledge between the physical printer and the cloud print service 200. If the physical printer shows the identification information (and authentication information for verifying correctness of the identification information if required) to the cloud print service 200, the physical printer becomes accessible to the cloud print service 200.

In the case of Google Cloud Print, if a user having a Google account performs a registration operation through a webpage for physical printer registration during login, Google Cloud Print issues a physical printer ID ("printer_id") that uniquely identifies the physical printer of a registration subject. The physical printer ID is stored in the physical printer of the registration subject, or in a computer, such as a personal computer (PC) that operates as a proxy of the physical printer. Google Cloud Print stores the physical printer ID, which is given to the registered physical printer, in association with the account of the user. Accordingly, the user, who has made the registration operation, is recognized as an administrator of the physical printer. Google Cloud Print sets the physical printer ID as one of available printers, to the logical printer 210 corresponding to the user. The physical printer or proxy connected with the physical printer verifies that the physical printer or proxy is a physical printer registered by the user, by showing the physical printer ID held therein to the cloud print service 200, and acquires the print job held in the logical printer 210 corresponding to the physical printer.

If the administrator of the physical printer makes share setting on administrator's logical printer 210, the administrator may allow other user, who is registered in the cloud print service 200, to use the logical printer 210 and the physical printer registered as an output target for the logical printer 210.

The cloud repository service 300 is a system that provides a repository service for a user on the Internet 400. The repository service is a service that stores data, programs, etc., and is also called on-line storage service. The cloud repository service 300 is a system typically including plural computers. Alternatively, the cloud repository service 300 may be formed of a single computer. Examples of the cloud repository service 300 may be Google Docs (trademark), Dropbox (trademark), and Evernote (trademark).

The cloud repository service 300, for each user, stores various files, such as document data and programs uploaded from the user, and provides the stored files to the user. The user executes user registration in the cloud repository service 300, and hence acquires a unique user ID in the service 300. The user logs in to the service 300 by using the user ID, and uploads and downloads files. In a case of services which collaborate with each other for user authentication, such as Google Cloud Printer and Google Docs, if a user logs in to an account of a first service (or an account which includes all services, such as Google account), the user may use a collaborating second service through the first service. Hereinafter, for simple description, it is assumed that the cloud repository service 300 collaborates with the cloud print service 200 for user authentication.

The mobile terminal 500 is an information processing apparatus which is carried by a user. For example, the mobile terminal 500 may be a smart phone, a tablet terminal, or a mobile phone. The mobile terminal 500 is accessible to a service, such as the cloud print service 200, on the Internet 400. The mobile terminal 500 has installed therein an application (hereinafter, called "cloud print application") that serves as a user interface (UI) when printing is instructed to the cloud print service 200.

In this example, it is assumed that a user who carries the mobile terminal 500 has an account in the cloud print service 200. Also, it is assumed that the image forming apparatus 100 has been registered in the cloud print service 200 by the administrator, and has received a physical printer ID. In this example, however, it is assumed that the user who carries the mobile terminal 500 is different from the administrator of the image forming apparatus 100 registered in the cloud print service 200. In this case, the user may use the cloud print service 200 through the mobile terminal 500, but may not designate an image forming apparatus 100 as an output target in related art (unless the above-described share setting is made).

Also, in the cloud print service of related art, such as Google Cloud Print, an output target is required to be designated from among previously registered physical printers (image forming apparatuses) in any case of direct designation and indirect designation (in a case of designating a logical printer and hence automatically designating a physical printer corresponding to the logical printer, as an output target). The cloud print service does not receive a print instruction if an output target is not determined yet.

In this situation, described below is a mechanism when a user, who carries the mobile terminal 500, executes printing with the image forming apparatus 100 as the output target through the cloud print service 200.

In this exemplary embodiment, the image forming apparatus 100 to be used by the user for printing has to have the cloud print support function, however, the image forming apparatus 100 does not have to be registered in the cloud print service 200 (of course, may be registered). That is, in this exemplary embodiment, even if the image forming apparatus 100 does not receive the physical printer ID from the cloud print service 200, the image forming apparatus 100 is allowed to acquire print data instructed by the user from the cloud print service 200 and to print the print data.

In this mechanism, a general-purpose logical printer 210 is associated with a user ID of each user, and is provided in the cloud print service 200. In this case, "general-purpose" represents that print data may be supplied to any physical printer as long as the physical printer is in conformity with cloud printing, without limiting to a specific physical printer registered in the logical printer. For example, the general-purpose logical printer 210 does not accept registration of a physical printer as an output target, and is merely used for a print instruction to an undetermined output target. For another example, a logical printer 210, in which a physical printer of an output target is registered, may be used as a general-purpose logical printer 210. In this case, printing a print instruction, which has sent to the logical printer 210, may be performed by the registered physical printer, or may be printed by other physical printer if a plan is changed.

When the user gives a print instruction of an undetermined output target (or a print instruction, the output target of which may be possibly changed from a planned output target), the user designates the general-purpose logical printer 210 as the target of the print instruction. The general-purpose logical printer 210 holds print data corresponding to the print instruction, and waits for an acquisition request of the print data from any of physical printers.

Then, when the output target of the print instruction sent to the general-purpose logical printer 210 is determined, the user delegates the access right of acquiring the print data from the general-purpose logical printer 210, to the physical printer of the output target. To delegate the access right, for example, a mechanism of OAuth is used in this exemplary embodiment. In this example, the user accesses the cloud print service 200 from the mobile terminal 500, which is operated by the user, and acquires an access token of OAuth for authorizing acquisition of the print data from the general-purpose logical printer 210 of the user. Then, when the physical printer of the output target is determined, the access token is passed from the mobile terminal 500 to the physical printer (image forming apparatus 100) by using a proximity communication system, such as Near Field Communication (NFC), Bluetooth (registered trademark), or Wireless Fidelity (Wi-Fi). The physical printer shows the access token received from the mobile terminal 500 to the cloud print service 200. Hence, the physical printer is authorized for an access to the general-purpose logical printer 210 of the user, acquires the print data from the logical printer 210, and prints out the print data.

OAuth is a protocol that provides a standard system for Application Programming Interface (API) authorization, which is secure for a desktop computer, a mobile terminal, a web application, etc. The use of OAuth is merely an example. Other protocol that may provide similar right delegation may be used.

Printing with use of the general-purpose logical printer 210 is called "ubiquitous printing" to avoid redundant description.

Figure 2:
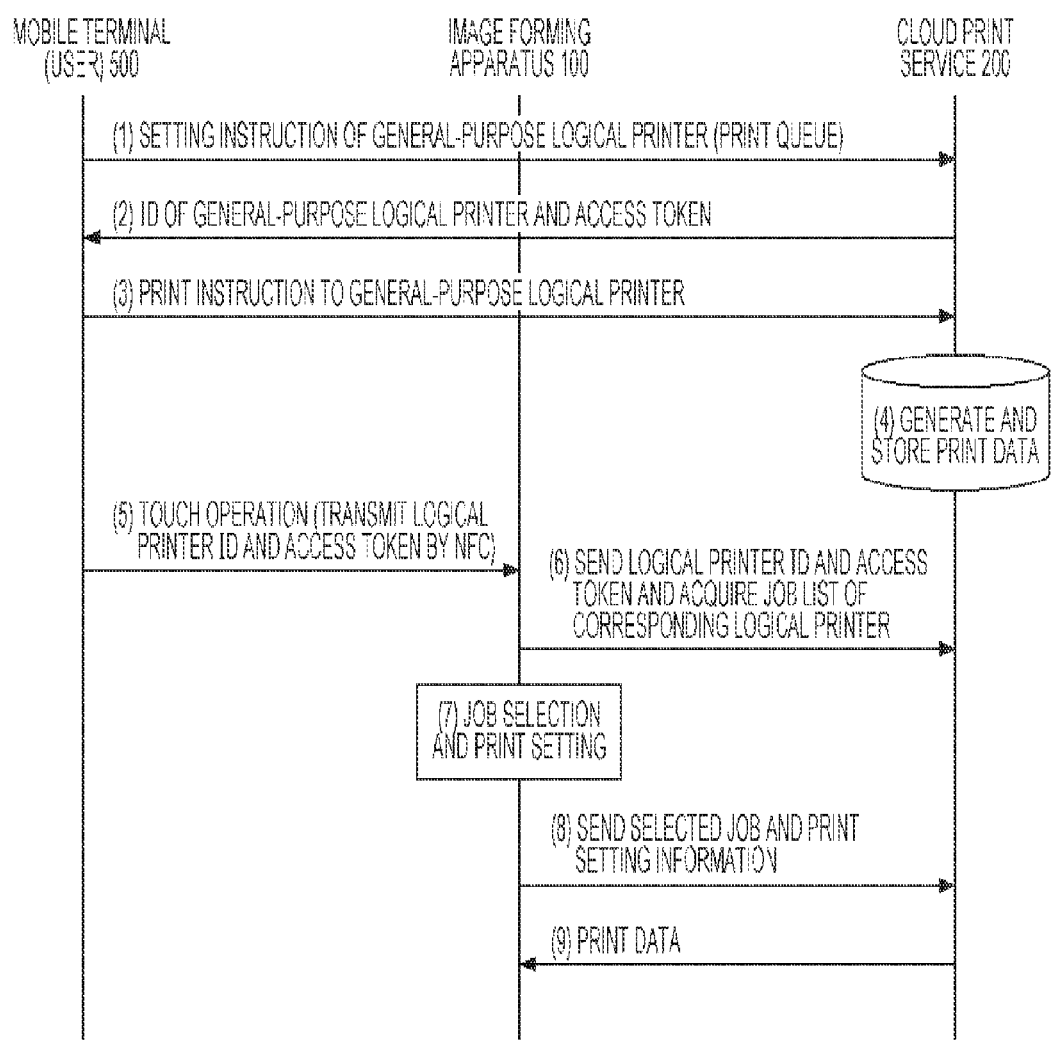
FIG. 2 illustrates an example processing flow according to the exemplary embodiment.

FIG. 2 shows an example flow of processing in this exemplary embodiment.

In this example, it is assumed that the image forming apparatus 100 and the mobile terminal 500 have units for proximity communication in accordance with a protocol of NFC.

(1) A user previously (before an actual instruction of "ubiquitous printing") instructs setting of a general-purpose logical printer 210, which serves as a temporary holder for a print instruction of an undetermined output target, to the cloud print service 200. This setting instruction may instruct generation of a new general-purpose logical printer 210, or may instruct setting of an existing logical printer 210 (in which a physical printer as an output target may be registered) as a general-purpose logical printer. The cloud print service 200 generates a new general-purpose logical printer 210 or sets an existing logical printer 210 as a general-purpose logical printer in response to the instruction. The general-purpose logical printer 210 has registered therein the user ID of the user as administrator attribute information. Accordingly, the logical printer 210 is associated with the user.

(2) The cloud print service 200 transmits the logical printer ID of the general-purpose logical printer 210 set in response to the setting instruction, and the access token of OAuth for allowing print data to be acquired from the logical printer 210, to the mobile terminal 500 of the user, who has sent the generation instruction.

The access token is, for example, data including authorization information which determines an authorization content for a person who shows the access token (in this example, the authorization content which is acquisition of the print data from the general-purpose logical printer 210 of the user). The authorization information includes, for example, a user ID in the cloud print service 200 of the user, and information indicative of the right of acquisition for print data corresponding to the user ID from the cloud print service 200. Alternatively, the authorization information may include a logical printer ID of the general-purpose logical printer 210 (in this case, only the access token may be transmitted in (2)). A character string, in which the authorization information seems to be random by encryption, may serve as an access token. Alternatively, instead of that the access token includes the authorization information, identification information may be added to the authorization information, the information may be stored in the cloud print service 200, and the identification information added to the authorization information may serve as an access token. In any system, the cloud print service 200, to which the access token is shown, may receive the authorization information corresponding to the access token. Alternatively, issued date and time or an expiration date may be associated with the access token or the authorization information, and if a predetermined time elapses since the issued date and time, or if the expiration date is passed, the access token may become invalid.

In this example, the access token is issued to the mobile terminal 500 when the general-purpose logical printer 210 is prepared in response to the instruction from the user, however, it is merely an example. Instead of this, for example, an access token may be issued when a print instruction to the general-purpose logical printer 210 is received from the user in a processing phase (3) (described later). For another example, an explicit issue request for requesting issue of the access token may be received from the user, and the access token may be issued in response to the issue request. In any case, since the user passes the user authentication from the cloud print service 200, the access token is issued according to the right of the authenticated user.

The mobile terminal 500, which has received the logical printer ID and the access token from the cloud print service 200, stores the logical printer ID and the access token as information for "ubiquitous printing") (for example, by associating the logical printer ID and the access token with identification information indicative of "ubiquitous printing").

(3) If the user wants to perform "ubiquitous printing" (that is, if there is a document desired to be printed, but a physical printer of an output target is not determined), the user logs in to the cloud print service 200, designates a document of a print subject to the general-purpose logical printer 210 associated with the user ID of the user, and instructs printing.

For example, a cloud print application is activated in the mobile terminal 500, and a user logs in to the cloud print service 200 with the user ID of the user. Then, a list of logical printers 210 available for the user (that is, logical printers in which the user is registered as the administrator or share user) is provided. The list includes the general-purpose logical printer 210 set in (1). The user selects a logical printer 210 which is used this time from the list on the screen of the cloud print application. In the story in FIG. 2, the general-purpose logical printer 210 for "ubiquitous printing" is selected.

To easily find the general-purpose logical printer 210 from the list of logical printers, information of the general-purpose logical printer 210 included in the list may have information indicative of "ubiquitous printing." In this case, when the list is displayed on the screen, the cloud print application displays the logical printer with the information of "ubiquitous printing" in a displaying form that is different from those of other normal logical printers. Alternatively, instead of that the user selects the logical printer 210 for "ubiquitous printing" from the list, "ubiquitous printing" may be included in an operation menu of the cloud print application, and if "ubiquitous printing" is selected from the menu, the cloud print application may automatically determine the general-purpose logical printer 210 as the target of the print instruction. A document of a print subject when a print instruction is given may be designated in a manner similar to related art. For example, the user designates a document in the mobile terminal 500 or the cloud repository service 300, as a print subject. If the cloud repository service 300 collaborates with the cloud print service 200 for authentication, if the user logs in to the cloud print service 200, a list of documents of the user stored in the cloud repository service 300 may be acquired, and a document of a print subject may be designated from the list.

(4) The general-purpose logical printer 210, which has received the print instruction, acquires the document of the print subject designated by the user from the mobile terminal 500, the cloud repository service 300, etc., converts the data of the document into a print data format, and stores the print data of the conversion result. In this case, instead of that the logical printer 210 actively acquires the document of the print subject, the mobile terminal 500 may acquire the document from the cloud repository service 300 etc., and may transmit the document to the logical printer 210. Alternatively, the mobile terminal 500 may instruct the cloud repository service 300 to provide the document of the print subject in the service 300 to the cloud print service 200. The cloud repository service 300 may transmit the document to the cloud print service 200 in response to the instruction. If a document in the mobile terminal 500 is designated as a print subject, the mobile terminal 500 may transmit the document to the cloud print service 200.

(5) After the instruction of "ubiquitous printing" in (3), it is assumed that the user determines that the print data according to the instruction is output from an image forming apparatus 100, which is found by the user in a visiting place. In this case, the user touches a reader/writer unit for NFC provided at the image forming apparatus 100 with the mobile terminal 500.

In response to the touch operation, the image forming apparatus 100 and the mobile terminal 500 start communication under the NFC standard. In this communication, the image forming apparatus 100 transmits a notification indicative of that "the image forming apparatus 100 is a printer" (or the image forming apparatus 100 is a printer temporarily available because of the mechanism according to the exemplary embodiment) to the mobile terminal 500. When the operating system (OS) of the mobile terminal 500 receives the notification, the OS activates, for example, the cloud print application. In this case, the activated cloud print application sends the logical printer ID and the access token stored as information for "ubiquitous printing" to the image forming apparatus 100 by using NFC.

In this example, the OS of the mobile terminal 500 determines whether or not the counterpart apparatus of the communication is the image forming apparatus 100 in conformity with the system of this exemplary embodiment. If it is determined that the counterpart apparatus of the communication is the image forming apparatus 100 in conformity with the system of this exemplary embodiment, the cloud print application is activated. This is a mere example. Instead of this, for example, when a touch operation is performed while the cloud print application is activated on the mobile terminal 500, the cloud print application may determine whether or not the counterpart apparatus of the NFC communication is the image forming apparatus 100 in conformity with the system of this exemplary embodiment.

(6) The image forming apparatus 100 sends a job list request including the received logical printer ID and access token to the cloud print service 200 through the Internet 400. The cloud print service 200 receives authorization information corresponding to the access token included in the received request. The authorization information includes the user ID and information indicative of the right of acquiring print data corresponding to the user ID. The cloud print service 200 recognizes that the image forming apparatus 100, which is the transmission source of the list acquisition request, has the right from the authorization information. Then, the cloud print service 200 sends a list of jobs (print data) in a queue of the logical printer corresponding to the logical printer ID included in the request (that is, the general-purpose logical printer of the user) to the image forming apparatus 100. The list includes identification information of the respective jobs in the queue.

(7) The image forming apparatus 100 displays the list of jobs on the display screen mounted therein, and causes the user to select a job to be output this time among the jobs on the list. Also, the image forming apparatus 100 may provide a UI screen for print setting, and may cause the user to set print conditions, such as designation of sheets, the number of printouts, and duplex printing or simplex printing.

Alternatively, the job list acquired from the cloud print service 200 may be provided to the mobile terminal 500 by NFC, and a print output subject may be designated and print setting may be executed on the screen of the mobile terminal 500. In this case, the output subject designation and the print setting result on the mobile terminal 500 are transmitted to the image forming apparatus 100 by NFC.

The designation for the job to be printed is completed (and if the user makes print setting, the setting operation is completed), and the user performs a print start operation.

(8) In response to the print start operation, the image forming apparatus sends a print data acquisition request including the identification information of the job selected as the output subject (and print setting information if available) to the cloud print service 200, for example, in the form of a GET request of HTTP.

(9) The cloud print service 200 (in particular, the general-purpose logical printer 210 specified in (6)) sends the print data corresponding to the identification information included in the request to the image forming apparatus 100 in response to the received print data acquisition request. The image forming apparatus 100 prints out the received print data on a sheet.

In the example in FIG. 2, NFC is used for transmission of the access token etc. from the mobile terminal 500 to the image forming apparatus 100. However, the system for proximity communication is not limited to NFC. For example, instead of NFC, other near field wireless communication system, such as Bluetooth (registered trademark) may be used. Alternatively, other proximity communication system using a transmission medium, such as infrared communication, may be used other than wireless system.

For another example of proximity communication, a camera may be provided at the image forming apparatus 100, and the camera may capture a picture of the access token etc. displayed on the screen of the mobile terminal 500. Thus, the access token may be transmitted. In this case, the display form of the access token is not particularly limited. For example, an image code, such as a QR (registered trademark) code or a bar cord, may be displayed on the screen, or a character string may be displayed on the screen. The image forming apparatus 100 obtains the value of the access token by analyzing the captured image by using an analysis algorism corresponding to the display form of the access token. This system and the system using NFC or infrared communication are common in view of that the user holding the mobile terminal 500 approaches the image forming apparatus 100, and bring the mobile terminal 500 close to the image forming apparatus 100, to make communication between the mobile terminal 500 and the image forming apparatus 100.

Figure 3:
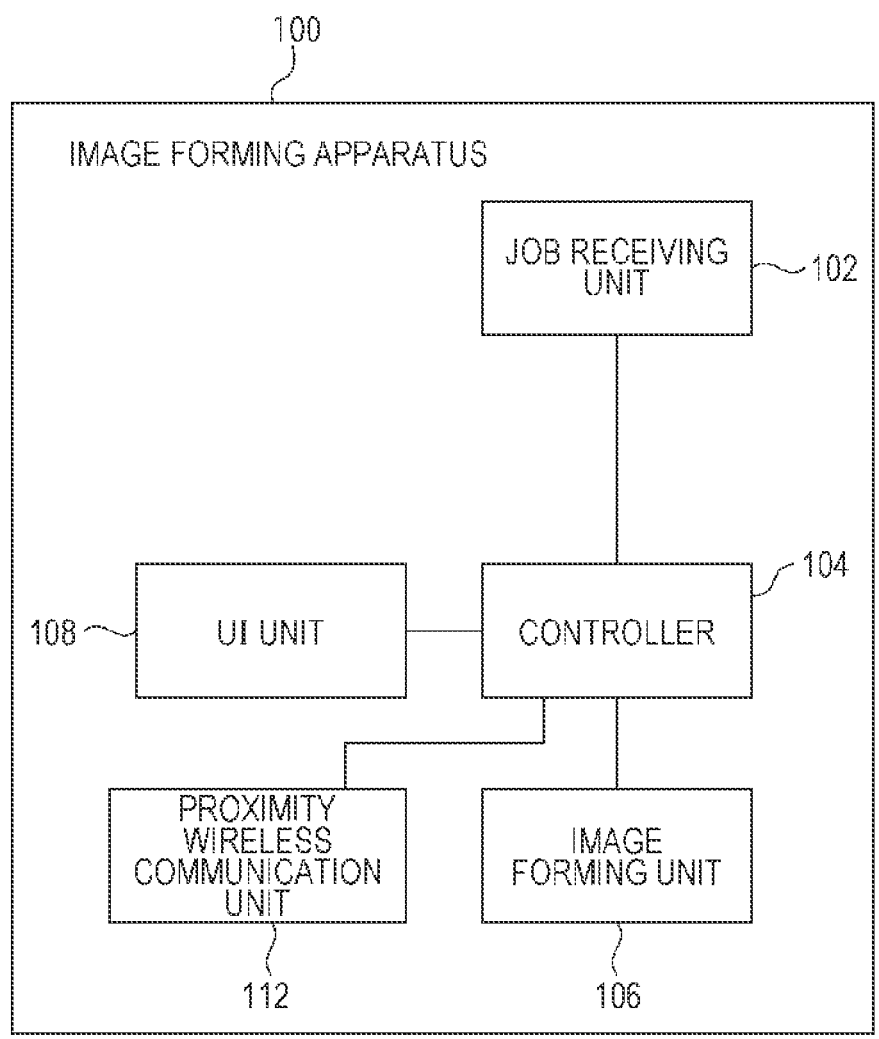
FIG. 3 illustrates an example capability configuration of an image forming apparatus.

Next, an example capability configuration of the image forming apparatus 100 that executes the above-described processing is described with reference to FIG. 3. FIG. 3 only illustrates parts deeply relating to the processing of this exemplary embodiment. Even in a case of a component typically included in the image forming apparatus, if the component is less relating to the processing of the exemplary embodiment, the illustration of the component is omitted.

In the image forming apparatus 100, a job receiving unit 102 communicates with the cloud print service 200, and performs processing such as reception of print data by using HTTP. An image forming unit 106 is a device that prints out an image on a medium such as paper. A controller 104 is a system that controls the entire image forming apparatus 100. For example, the controller 104 instructs an image processing unit (not illustrated) to convert the print data received by the job receiving unit 102 from the cloud print service 200 into image data of a raster format etc. which may be handed by the image forming unit 106, to supply the image data of the conversion result, and to print the image data on a medium. A user interface (UI) unit 108 displays a screen for receiving an operation from the user to the image forming apparatus 100, and receives an operation input from the user in accordance with the screen. A proximity wireless communication unit 112 is a device that makes communication under the NFC standard. When the user brings the mobile terminal 500 in conformity with NFC close to the reader/writer unit of the image forming apparatus 100, the proximity wireless communication unit 112 recognizes a device in conformity with NFC (the mobile terminal 500). Based on this recognition, the controller 104 transmits information etc. indicative of that "the image forming apparatus 100 is a printer" to the mobile terminal 500 through the proximity wireless communication unit 112. Also, the controller 104 acquires information for "ubiquitous printing" (that is, the logical printer ID of the general-purpose logical printer 210 and the access token) from the mobile terminal 500 through the proximity wireless communication unit 112. Further, with this information, the job receiving unit 102 acquires the job list in the general-purpose logical printer 210 from the cloud print service 200, causes the job list to be displayed on the UI unit 108, and receives selection of a job as an output subject of this time from the user. The controller 104 acquires print data of the selected job from the cloud print service 200 through the job receiving unit 102.

Figure 4:
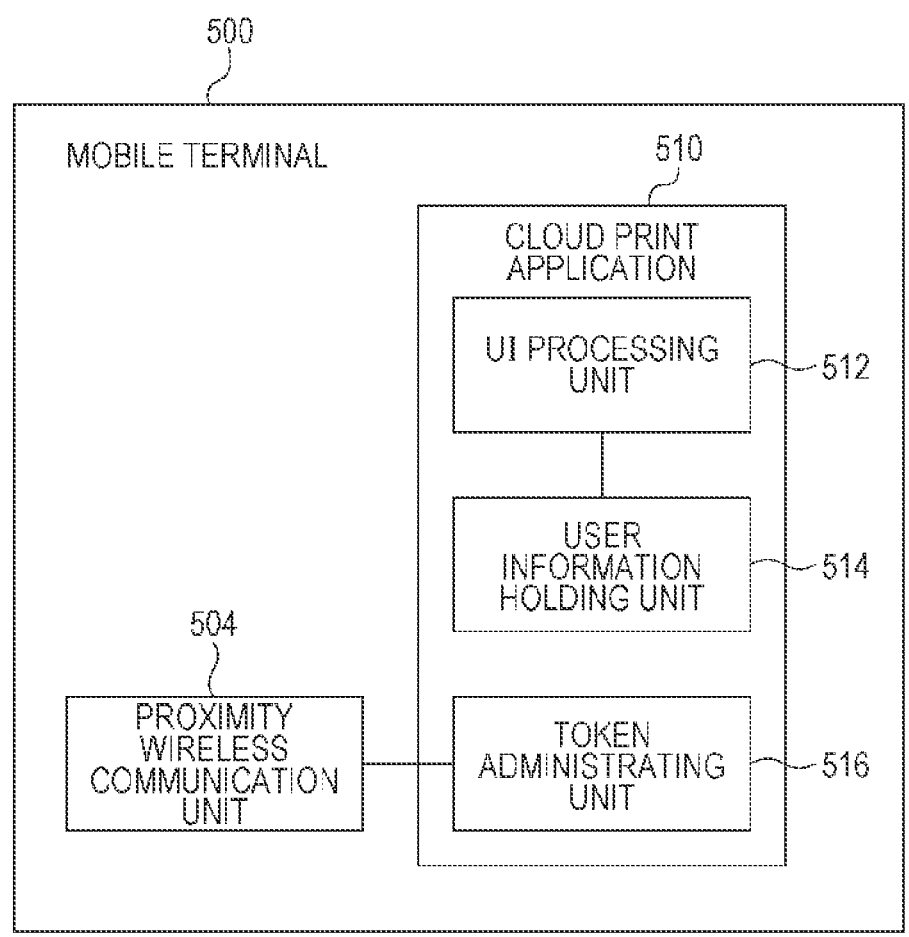
FIG. 4 illustrates an example capability configuration of a mobile terminal.

Next, an example capability configuration of the mobile terminal 500 that executes the above-described processing is described with reference to FIG. 4. FIG. 4 only illustrates parts deeply relating to the processing of this exemplary embodiment. Even in a case of a component typically included in the mobile terminal, if the component is less relating to the processing of the exemplary embodiment, the illustration of the component is omitted.

A cloud print application 510 is installed in the mobile terminal 500. The cloud print application 510 is an application used for printing from the mobile terminal 500 through the cloud print service 200. The cloud print application 510 includes a UI processing unit 512 that provides a user interface for printing with use of the cloud. A user information holding unit 514 holds an account (user ID etc.) in the cloud print service 200 of the user who carries the mobile terminal 500. The account information is previously set by the user. Alternatively, instead of the cloud print application 510, the OS of the mobile terminal 500 may administer the account information.

When the cloud print application 510 is activated, the cloud print application 510 accesses the cloud print service 200 on the Internet 400 through a mobile phone line or a wireless network, and logs in to the cloud print service 200 by using the account held in the user information holding unit 514. The UI processing unit 512 displays a UI screen provided from the cloud print service 200 in response to login. If the user instructs setting of the general-purpose ("ubiquitous printing") logical printer 210 through the UI screen, the instruction is transmitted from the UI processing unit 512 to the cloud print service 200. In response to the instruction, the cloud print service 200 prepares the general-purpose logical printer 210 for the user. Also, for example, if the user instructs acquisition of the access token for "ubiquitous printing" on the UI screen of the UI processing unit 512, the access token (and the logical printer ID of the general-purpose logical printer 210) is sent from the cloud print service 200 through the Internet in response to the instruction.

A token administering unit 516 holds the information for "ubiquitous printing" acquired from the cloud print service 200 (that is, the logical printer ID of the general-purpose logical printer 210 and the access token). Also, the token administering unit 516 provides the information for "ubiquitous printing" held therein to the image forming apparatus 100 by a proximity wireless communication unit 504 to the image forming apparatus 100, when the mobile terminal 500 touches the image forming apparatus 100.

Figure 5:
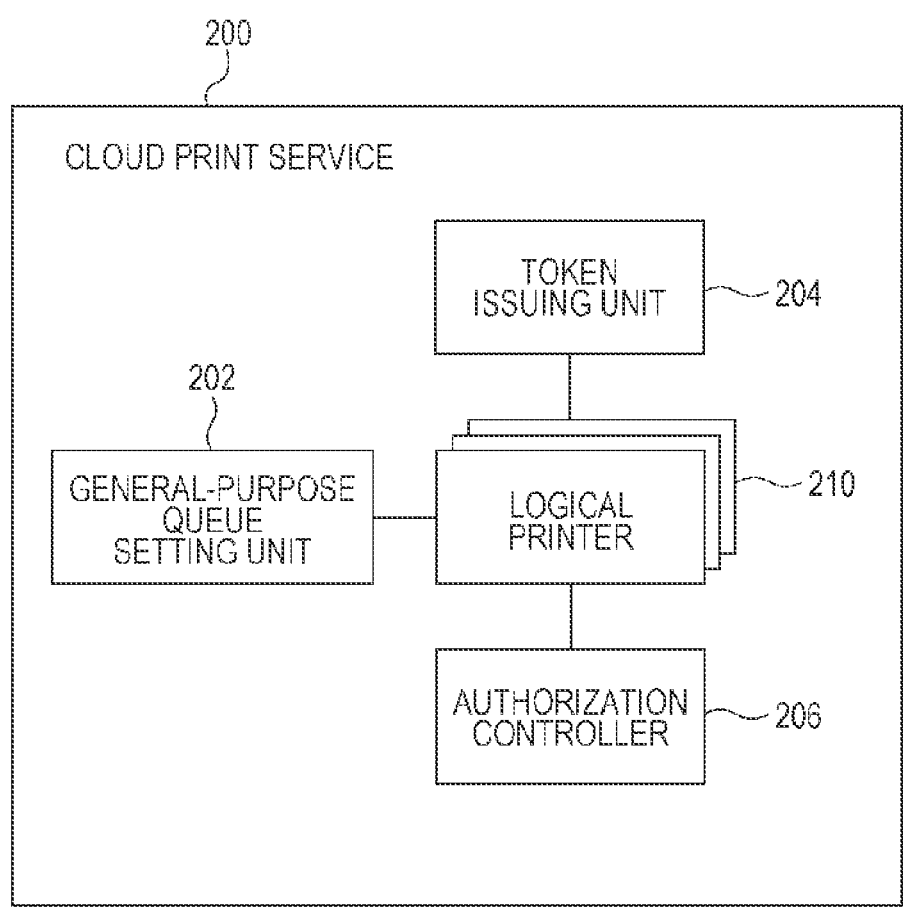
FIG. 5 illustrates an example capability configuration of a cloud print service.

Next, an example capability configuration of the cloud print service 200 that executes the above-described processing is described with reference to FIG. 5. FIG. 5 only illustrates parts deeply relating to the processing of this exemplary embodiment. Even in a case of a component typically included in the mobile terminal, if the component is less relating to the processing of the exemplary embodiment, the illustration of the component is omitted.

The cloud print service 200 includes a general-purpose queue setting unit 202, a token issuing unit 204, an authorization controller 206, and a logical printer 210. The logical printer 210 has been described above. The general-purpose queue setting unit 202 sets a general-purpose logical printer 210 (queue) associated with the user ID of the user in response to an instruction of the user ((1) in FIG. 2) from the mobile terminal 500 etc. (newly generates a general-purpose logical printer 210 or sets an existing logical printer 210 as "general-purpose"). The token issuing unit 204 issues an access token for authorizing acquisition of print data from the general-purpose logical printer 210 in response to a request from the mobile terminal 500 ((2) in FIG. 2). When the authorization controller 206 receives the access token sent from the image forming apparatus 100, which has acquired the access token, the authorization controller 206 authorizes the apparatus to perform an operation of an authorization subject indicated by authorization information corresponding to the access token. Herein, in this exemplary embodiment, the access token is for authorizing an operation relating to acquisition of print data from the general-purpose logical printer 210 designated as a subject of the token. Hence, the authorization controller 206 notifies the logical printer 210, which is the subject of the access token, about that the image forming apparatus 100 is authorized to perform the operation relating to acquisition of print data. In response to the notification, the logical printer 210 permits the request for a job list and the request for print data from the image forming apparatus 100.

Figure 6:
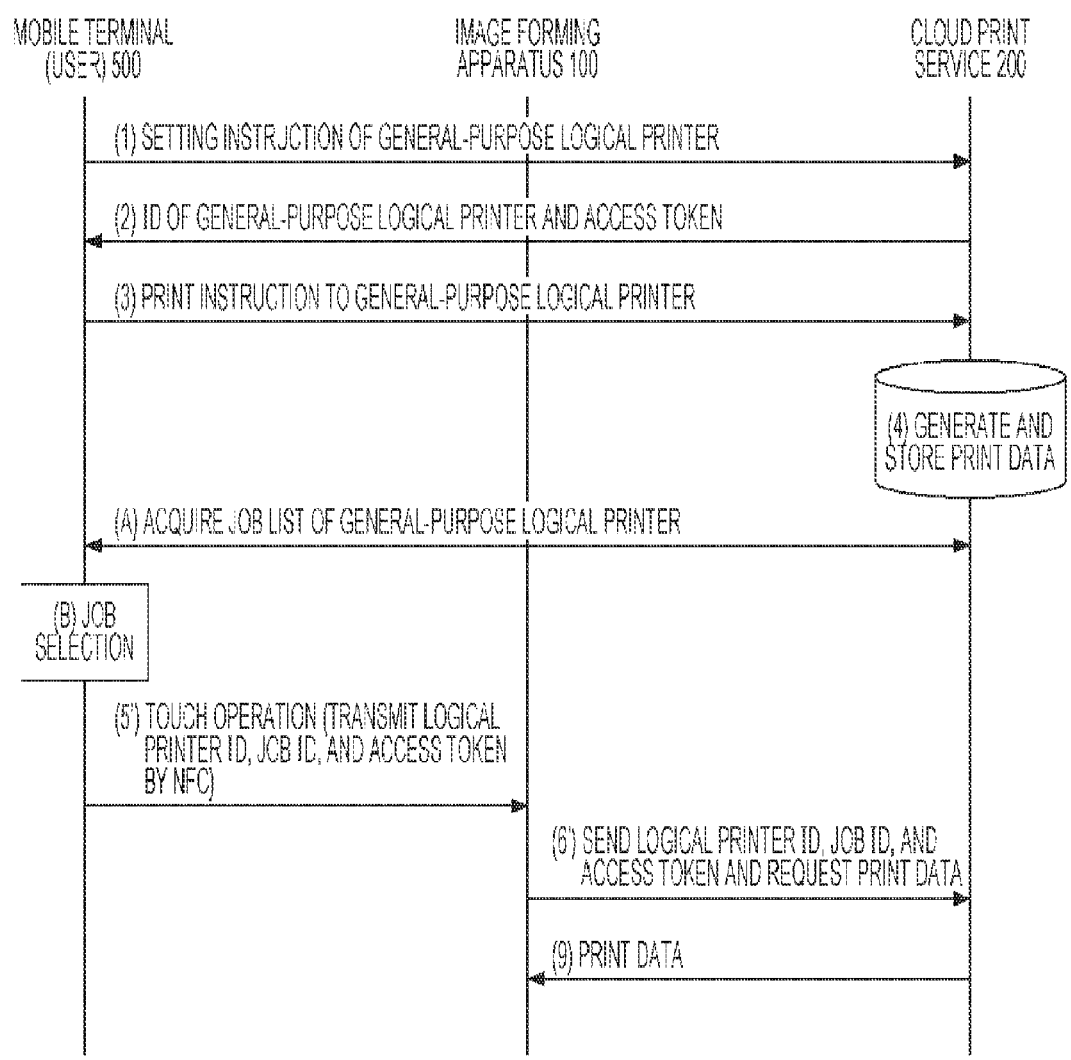
FIG. 6 illustrates an example processing flow according to a modification.

Next, a modification is described with reference to FIG. 6. In the above-described exemplary embodiment (see FIG. 2), (5) by the touch operation of bringing the mobile terminal 500 close to the image forming apparatus 100, (6) the job list in the general-purpose logical printer 210 is acquired from the cloud print service 200, and (7) the user is caused to select the output subject from the list.

In contrast, according to a modification in FIG. 6, a flow of processing becomes as described below.

(A) Before the touch operation (5'), the user logs in to the cloud print service 200 from the cloud print application 510 of the mobile terminal 500, and the user acquires the job list in the general-purpose logical printer 210.

(B) The cloud print application 510 displays the job list, and causes the user to select the output subject of this time from the list. In response to the selection, the cloud print service 200 sends the identification information (job ID) of the selected job (print data) to the cloud print application 510. The cloud print application 510 stores the received job ID as an item of information for "ubiquitous printing."

(5') Then, if the user determines that the job selected in (A) is printed by an image forming apparatus 100 which is found at a visiting place, the user touches the reader/writer unit of the image forming apparatus 100 with the mobile terminal 500. Accordingly, the information for "ubiquitous printing" held in the mobile terminal 500, that is, the general-purpose logical printer ID, the access token, and the job ID of the output subject selected in (A) are transmitted to the image forming apparatus 100 by NFC. Also, after the touch operation, the UI of the image forming apparatus 100, or the mobile terminal 500 may perform print setting. In the later case, the image forming apparatus 100 may provide a print setting screen corresponding to performance information of the image forming apparatus 100 to the mobile terminal 500, and may acquire the setting result of the print setting screen on the mobile terminal 500 from the mobile terminal 500 by NFC etc.

(6') The image forming apparatus 100 sends the print data acquisition request including the received logical printer ID, access token, and job ID to the cloud print service 200.

(9) In response to this request, the logical printer 210 indicated by the logical printer ID in the cloud print service 200 sends the print data corresponding to the job ID to the image forming apparatus 100. The image forming apparatus 100 prints out the received print data on a sheet.

The above-exemplified image forming apparatus 100, cloud print service 200, portion of performing the information processing of the mobile terminal 500 are provided by causing a general-purpose computer to execute a program expressing the processing of the respective capability modules of the apparatus. The computer mentioned here has, for example, a circuit configuration in which a microprocessor, such as a central processing unit (CPU); memories (primary memories), such as a random-access memory (RAM) and a read-only memory (ROM); a secondary storage controller that controls secondary memories, such as a hard disk drive (HDD), a solid-state drive (SSD), and a flash memory; various input/output (I/O) interfaces; and a network interface that controls connection with a wireless or wired network, as hardware, are connected through, for example, a bus. Also, for example, a disk drive for reading from and/or writing on a portable disk storage medium, such as a compact disc (CD), a digital versatile disc (DVD), or a Blu-ray Disc; a memory reader/writer for reading from and/or writing on a portable non-volatile storage medium of any kind of various standards, such as a flash memory; etc., may be connected to the bus through, for example, I/O interfaces. The program having written thereon the processing contents of the above-exemplified respective capability modules is stored in the secondary memory, such as a flash memory, through the storage medium, such as a CD or a DVD, or a communication system, such as a network, and is installed in a computer. The program stored in the secondary memory is read into the RAM and is executed by the CPU etc. Accordingly, the above-exemplified capability module group is provided.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print system comprising:
    a print service system;
    an information processing apparatus configured to be operated by a user;
    an image forming apparatus;
    wherein the print service system comprises:
        a holding unit that is associated with the user, wherein the holding unit is configured to hold print data, which is instructed by the user for printing; and a providing unit configured to provide access authorization information for the holding unit to the information processing apparatus;
an access authorizing unit configured to authorize an access to the holding unit corresponding to the access authorization information in response to receiving the access authorization information from the image forming apparatus,
  wherein the access authorizing unit is configured to send a list of print data which is held in the holding unit, to the image forming apparatus,
a print data providing request receiving unit configured to receive a print data providing request from the image forming apparatus,
  wherein the print data providing request comprises a request to provide selected print data, and
  wherein the selected print data is selected from the list of print data,
a print data providing unit configured to provide the selected print data held in the holding unit for print processing to the image forming apparatus;
wherein the information processing apparatus comprises:
  a transmitting unit configured to transmit the access authorization information received from the print service system to the image forming apparatus by proximity communication, and
wherein the image forming apparatus comprises:
  an access authorization information acquiring unit configured to acquire the access authorization information from the information processing apparatus by the proximity communication;
  a list of print data receiving unit configured to receive the list of print data from the print service system; and
  a print data acquiring unit configured to acquire the selected print data held in the holding unit.

2. A method for controlling a print system, the method comprising:
holding, by a holding unit of a print service system, print data, which is instructed by a user for printing,
  wherein the holding unit is associated with the user;
providing, by a providing unit of the print service system, access authorization information for the holding unit to an information processing apparatus configured to be operated by the user;
authorizing, by an access authorizing unit of the print service system, an access to the holding unit corresponding to the access authorization information in response to receiving the access authorization information from an image forming apparatus,
sending, by the access authorizing unit, a list of print data which is held in the holding unit, to the image forming apparatus,
receiving, by a print data providing request receiving unit of the print service system, a print data providing request from the image forming apparatus,
  wherein the print data providing request comprises a request to provide selected print data, and
  wherein the selected print data is selected from the list of print data,
providing, by a print data providing unit of the print service system, the selected print data held in the holding unit for print processing to the image forming apparatus:
transmitting, by a transmitting unit of the information processing apparatus, the access authorization information received from the print service system to the image forming apparatus by proximity communication;
acquiring, by an access authorization information acquiring unit of the image forming apparatus, the access authorization information from the information processing apparatus by the proximity communication;
receiving, by a list of print data receiving unit of the image forming apparatus, the list of print data from the print service system; and
acquiring, by a print data acquiring unit of the image forming apparatus, the selected print data held in the holding unit.

3. A print service system comprising:
a holding unit associated with a user of an information processing apparatus connected to the print service system via a network,
  wherein the holding unit is configured to hold print data, which is instructed by the user for printing;
an access authorization information providing unit configured to provide access authorization information for the holding unit associated with the user, to the information processing apparatus in response to a request from the information processing apparatus;
an access authorizing unit configured to authorize an access to the holding unit corresponding to the access authorization information in response to the access authorizing unit receiving the access authorization information from an image forming apparatus connected to the print service system via the network,
  wherein the access authorizing unit is configured to send a list of print data which is held in the holding unit to the image forming apparatus, and
  wherein the access authorization information is acquired by the image forming apparatus from the information processing apparatus by proximity communication between the information processing apparatus and the image forming apparatus;
a print data providing request receiving unit configured to receive a print data providing request from the image forming apparatus,
  wherein the print data providing request comprises a request to provide selected print data, and
  wherein the selected print data is selected, at the image forming apparatus, from the list of print data; and
a print data providing unit configured to provide the selected print data held in the holding unit for print processing to the image forming apparatus.

4. A print system comprising:
a print service system;
an information processing apparatus configured to be operated by a user;
an image forming apparatus,
wherein the print service system comprises:
  a holding unit that is associated with the user, wherein the holding unit is configured to hold print data, which is instructed by the user for printing; and
  a providing unit configured to provide access authorization information for the holding unit to the information processing apparatus;
  an access authorizing unit configured to authorize an access to the holding unit corresponding to the access authorization information in response to receiving the access authorization information from the information processing apparatus,
    wherein the access authorizing unit is configured to send a list of print data which is held in the holding unit to the information processing apparatus, a print data providing request receiving unit configured to receive a print data providing request from the image forming apparatus;

wherein the information processing apparatus comprises:
- a transmitting unit configured to transmit the access authorization information received from the print service system to the image forming apparatus by proximity communication; and
- a list of print data receiving unit configured to receive the list of print data from the print service system, and wherein the image forming apparatus comprises:
- an access authorization information acquiring unit configured to acquire the access authorization information and print data identifying information from the information processing apparatus by the proximity communication; and
- a print data acquiring unit configured to acquire print data identified by the print data identifying information that is held in the holding unit.

5. A method for controlling a print system, the method comprising:

holding, by a holding unit of a print service system, print data, which is instructed by a user for printing, wherein the holding unit is associated with the user;

providing, by a providing unit of the print service system, access authorization information for the holding unit to an information processing apparatus configured to be operated by the user;

authorizing, by an access authorizing unit of the print service system, an access to the holding unit corresponding to the access authorization information in response to receiving the access authorization information from the information processing apparatus;

sending, by the access authorizing unit, a list of print data which is held in the holding unit to the information processing apparatus;

receiving, by a print data providing request receiving unit of the print service system, a print data providing request from an image forming apparatus;

transmitting, by a transmitting unit of the information processing apparatus, the access authorization information received from the print service system to the image forming apparatus by proximity communication;

receiving, by a list of print data receiving unit of the information processing apparatus, the list of print data from the print service system;

acquiring, by an access authorization information acquiring unit of the image forming apparatus, the access authorization information and print data identifying information from the information processing apparatus by the proximity communication; and acquiring, by a print data acquiring unit of the image forming apparatus, print data identified by the print data identifying information that is held in the holding unit.

6. A print service system comprising:

a holding unit that is associated with a user of an information processing apparatus connected to the print service system via a network,
  wherein the holding unit is configured to hold print data, which is instructed by the user for printing;

an access authorization information providing unit configured to provide access authorization information for the holding unit associated with the user, to the information processing apparatus in response to a request from the information processing apparatus;

an access authorizing unit configured to authorize an access to the holding unit corresponding to the access authorization information in response to the access authorizing unit receiving the access authorization information from the information processing apparatus,
  wherein the access authorizing unit is configured to send a list of print data which is held in the holding unit to the information processing apparatus, and
  wherein the access authorization information and print data identifying information are acquired by an image forming apparatus connected to the print service system via the network, by proximity communication between the information processing apparatus and the image forming apparatus;

a print data providing request receiving unit configured to receive a print data providing request from the image forming apparatus; and a print data providing unit configured to provide to the image forming apparatus print data identified by the print data identifying information that is held in the holding unit.

* * * * *